United States Patent
Schmitt

(10) Patent No.: US 6,502,623 B1
(45) Date of Patent: Jan. 7, 2003

(54) PROCESS OF MAKING A METAL MATRIX COMPOSITE (MMC) COMPONENT

(75) Inventor: Theodore Nicolas Schmitt, Vienna (AI)

(73) Assignee: Electrovac, Fabrikation elektrotechnischer Spezialartikel Gesellschaft m.b.H., Klosterneuburg (AT)

(*) Notice: Subject to any disclaimer, the term of this patent is extended or adjusted under 35 U.S.C. 154(b) by 0 days.

(21) Appl. No.: 09/651,989

(22) Filed: Aug. 30, 2000

(30) Foreign Application Priority Data

Sep. 22, 1999 (AT) .............................................. 1619/99

(51) Int. Cl.⁷ ............................................. B22C 15/10
(52) U.S. Cl. ........................................... 164/97; 164/39
(58) Field of Search ............................. 164/97, 91, 98, 164/39

(56) References Cited

U.S. PATENT DOCUMENTS

| | | | |
|---|---|---|---|
| 4,975,225 A | * 12/1990 | Vivaldi et al. | ............... 264/28 |
| 5,137,540 A | * 8/1992 | Halpert et al. | ............... 51/293 |
| 5,187,128 A | * 2/1993 | White et al. | ............... 501/96 |
| 5,232,040 A | * 8/1993 | Johnson et al. | ............... 164/91 |
| 5,247,986 A | * 9/1993 | Kantner et al. | ............... 164/97 |
| 5,287,911 A | * 2/1994 | Aghajanian et al. | ......... 164/101 |
| 5,296,419 A | * 3/1994 | White et al. | ................... 501/96 |
| 5,346,660 A | * 9/1994 | Matsumoto | ................... 264/69 |
| 5,553,657 A | * 9/1996 | Aghajanian et al. | ........... 164/97 |

FOREIGN PATENT DOCUMENTS

WO     WO 99/32679     7/1999

* cited by examiner

*Primary Examiner*—M. Alexandra Elve
*Assistant Examiner*—Len Tran
(74) *Attorney, Agent, or Firm*—Henry M. Feiereisen

(57) ABSTRACT

A process for making a metal-matrix composite (MMC), includes a mixture of particulate ceramic powder with a liquid carrier, without addition of a binder, to prepare a slip having thixotropic properties. The slip is introduced in a substantially dense consistency into a casting mold which is then subjected to vibrations so as to separate the carrier from the ceramic particles and to allow the carrier to float upon the ceramic particles while at the same time compacting the slip to realize a ceramic preform of porous consistency having pores. After terminating the exposure of the casting mold to vibrations, the liquid carrier is removed and the preform is allowed to solidify in the casting mold, without exposure to any further compaction measures, such as sintering, pressing or the like, and the casting mold is maintained in a position of rest. Subsequently, matrix metal is poured into the casting mold to fill the pores of the preform.

24 Claims, 3 Drawing Sheets

PROCESS OF MAKING A METAL MATRIX COMPOSITE (MMC) COMPONENT

CROSS-REFERENCES TO RELATED APPLICATIONS

This application claims the priority of Austrian Patent Application, Serial No. 1619/99, filed Sep. 22, 1999, the subject matter of which is incorporated herein by reference.

BACKGROUND OF THE INVENTION

The present invention relates to a process of making a metal matrix composite (MMC) composite comprised of a preform having a ceramic, porous consistence with pores filled with matrix metal.

MMC is a material in which a preform and a metal are embedded within one another at different quantitative ratios. In the following description, the term "preform" will denote a porous structure made from a reinforcing material. The configuration of the preform material may be selected in a wide variety. For example, the preform may be comprised of single parts of random geometry (spherical, angular, of short fibers or long fibers, or in form of whiskers). It is also possible to provide the preform of one or more bodies of different sizes and porous structure.

Metal is poured to infiltrate the spaces between the individual parts and/or in the pores of a porous body. The so-called infiltration process is substantially a casting process by which metal is introduced into the very narrow pores of the preform. In case of a poor wetting behavior between the material of the preform and the metal in the pores, the metal must be forced into the voids of the pores. This is typically implemented through pressure application by which pressure, e.g. gas pressure or mechanical pressure by means of a die, is applied upon the liquid metal for pressing the metal into the pores of the preform. Another example of an infiltration process includes the decrease of surface tension of the liquid metal to such an extent that the metal can penetrate the pores of the preform even without application of a particular pressure. This type of infiltration process is commonly referred to as "spontaneous infiltration". The decrease of the surface tension of the metal can be realized by reacting the liquid metal with respective agents that decrease the surface tension, for example by mixing these agents to the liquid metal or by introducing these agents into the ambient atmosphere of the liquid metal.

The solidification of the liquid metal is realized in the event of non-wetted preform-metal systems under pressure to prevent a segregation, i.e. to prevent metal introduced into the preform from oozing out from the pores again.

The purpose of the preform is to impart the finished composite and/or the used matrix material with particular or special mechanical, thermal and electrical properties, which are substantially determined by the arrangement and composition of the preform. For example, the volume portion together with the modulus of elasticity governs the expansion coefficient. A high modulus of elasticity and a high packing density result in a low expansion coefficient whereas a low modulus of elasticity and a same packing density leads to a comparably high expansion or requires a very high volume portion. Different compositions of the material influence, for example, the thermal conductivity. A composite of aluminum and $Al_2O_3$ has a substantially lower conductivity than a composite of Al and SiC. Moreover, the type of infiltration metal impacts on the mechanical, electrical and thermal properties of the resultant MMC. Examples for typical infiltration metal includes aluminum, magnesium, copper as well as alloys comprised of one or more of these metals. Of course, other metals or metal-like elements may be usable as well.

The production of porous ceramic components that can be used as preform for such MMC components includes a variety of shaping processes, such as injection molding, hot casting, dry pressing, film casting, vacuum casting and slip casting. Each of the mentioned processes uses ceramic powder with a binder, lubricant etc., and the mixture is made flowable and shaped into the desired configuration. Slip casting may be carried out without addition of a binding agent.

By way of example only, the following description refers in more detail to the hot casting process. In this process, thermoplastics (up to 45% by volume), such as, e.g., paraffins or waxes, are used as binders and added to the ceramic powder. By raising the temperature, this mixture becomes liquid, and the hereby obtained flowing mass is poured into a mold. After solidification of the binder, the preform is ejected, the binder is expelled through heating, and the material is sintered. Depending on the duration of the sintering process and the selected sintering temperature, a porous, self-contained or dense structure is produced.

Preforms may also be produced by an injection molding process in which a powder mixture blended with binder (up to 40% binder fraction is required) is injected into a respective mold and allowed to cure. The binder is removed thereafter in a same manner as described with reference to the hot casting process.

A further possibility is the dry pressing process of ceramics, in which a flowable powder mixture is filled into a respective preform mold and pressed by a die into the desired shape. The required binder or also assisting pressing agents may hereby be provided of less complex configuration compared to the afore-mentioned hot casting process, and the quantity being used is also substantially smaller. Suitable binding agents include stearates and paraffins.

The use of a binder, e.g. stearic acid as oftentimes employed in conventional processes, has the drawback that the extraction of the binder requires a time-consuming process—typically heating of the ceramic particle mass to a temperature above the evaporation point of the binder, after removal of a liquid carrier—and entails the risks that the involved high temperatures result in a deformation of the molded product, and a reaction of gases of the ambient atmosphere, in particular oxygen with the ceramic particles, leading to undesired compounds that adversely affect the properties of the resultant preform and ultimately of the resultant MMC component.

In all these shaping process or preform processes, the required amounts of organic additives are removed again after obtaining the desired configuration, typically through thermal processes. As a consequence of the high fraction of organic substance, this process must be carried out at a slow speed, in particular when the formed body has an irregular geometry because, otherwise, the surface may crack, or deformations in the formed component may be experienced, rendering the use unsuitable. Depending on the particular addition of binder and lubricant, their removal is carried out at temperatures of 300° C. to 700° C. according to a time schedule that is selected to the specific material and product. Kilns with complicated temperature programs and temperature profiles, which must be maintained very accurately, are required hereby. The process may take several days, depending on the complexity of the component. Also, the subsequent sintering process requires a very slowly and careful heating profile to prevent internal tensions as best as possible. The same care is required for the subsequent cooling to room temperature.

Practice has shown that slip casting is a particular simple process to make ceramic components, in particular preforms as basis for MMC components. Slip casting is in particular suitable for the production of preforms comprised of SiC, although preforms made of different ceramic powders such as carbides, nitrides, borides, oxides or mixtures thereof such as, oxynitrides, can be made by slip casting as well. Concrete materials for the ceramic powder include, for example, SiC, TiC, $B_4C$, AlN, $Si_3N_4$, BN, and $Al_2O_3$.

In the description, the term "slip" will denote a mixture of a powder with a particular amount of liquid carrier. In this context, the slip includes a ceramic powder to which, for example, water as liquid carrier has been added. When mixing liquid carrier to a ceramic powder, the flow limit of this dispersion is decreased to such an extent as to obtain an intrinsically viscous liquid. This dispersion behaves completely rigidly below a particular tension while being deformable without any resistance above this particular tension. Application of shearing forces decrease the flow limit, and the slip can be cast to the desired configuration.

A further increase of the fraction of liquid carrier results in a fluid slip, i.e., the slip can be cast in a mold without influence of shearing forces.

Conventionally, the production of a ceramic structure by means of a slip casting process, regardless whether the slip is fluid or has thixotropic properties, has been carried out by one of two options:

a) the slip contains, apart from the liquid carrier, no binders, and is introduced in two casting molds having porous walls.

b) the slip contains, apart from the liquid carrier, a binder, and is poured into casting molds of substantially dense consistency.

In the variation a), the porous casting molds are made predominantly of plaster, although ceramic and metallic porous materials have been considered as well. The porosity of the casting molds is intended to extract the liquid carrier from the introduced slip and to thereby slightly compact the slip. The extraction of the liquid carrier commences in areas of the slip that immediately adjoin the casting mold. Thus, as initially the outer layers of the resulting ceramic structure consolidate, the transport of liquid, still retained within into the pores of the casting mold becomes impaired, so that the extraction of liquid, realized by the porous casting mold, results in a poor compactness of the obtained ceramic structure. As a consequence, a further drying step is required to impart the ceramic structure with a sufficient stability that allows a removal or other manipulations. Moreover, the extraction of liquid is very slow as a consequence of the capillary effect of the pores of the casting mold so that the overall production takes too long to be considered economical. During this extraction of liquid, the fine particles of the ceramic powder are entrained with the extracted liquid to a greater extent than the coarse particles and collect primarily in the bottom area of the casting mold. Thus, an undesired concentration gradient is experienced in the final ceramic product. Moreover, the fine particles may also deposit in the porous casting mold, thereby effecting a certain bond of the resulting ceramic structure with the casting mold so that the detachment of the ceramic structure from the casting mold becomes significantly more difficult. A further drawback is the very slight density of the resulting ceramic structure, i.e. the ceramic structure has a relatively great porosity. In order to provide this ceramic structure with a denser consistency, sintering is required, resulting, however, in a shrinkage so that the dimensions of the structure are reduced to an extent that is not negligible. The manufacture of precisely predefined dimensions of the ceramic structure is thus very difficult to realize with this type of method.

In the variation b), no extraction of liquid carrier is realized so long as the slip remains in the casting mold. Rather, consolidation of the slip is implemented by freezing the liquid carrier. Subsequently, the slip is removed from the casting mold, dried through sublimation or evaporation, and sintered. Also this method suffers shortcomings. The resultant structure has also only a relative low density. Further, the liquid carrier not only freezes within itself and holds the particles of the ceramic powder tightly together but freezes also upon the wall surface of the casting mold so that the detachment of the ceramic structure from the casting mold causes problems. A change of material of the casting mold and/or using different carrier liquids is unlikely to overcome this problem. The use of casting mold surfaces which have been polished in a particularly smooth manner may lead to better results, however it is complicated to fabricate. The application of release agents on the casting mold surface may be conceivable; However, there is the risk of introducing foreign matters into the ceramic structure.

Heretofore, the infiltration process, i.e. the introduction of metal into the pores of the preform, is carried out after the production of a preform in a manner described above, whereby the preform is placed into another casting mold that is different than the casting mold used for producing the preform. Thus, the MMC manufacturing process, comprised of preform production and infiltration with metal, has the problems associated with the transfer of the preform from the first casting mold to the second casting. These problems are primarily based on the difficulty to detach the preform from the first casting mold as well as on the necessity to provide the preform with a sufficient strength to permit further processing, through provision of a further method step (freezing or sintering of the slip) while the slip is in the first casting mold.

SUMMARY OF THE INVENTION

It is thus an object of the present invention to provide an improved process for making MMC components, obviating the afore-stated drawbacks.

In particular, it is an object of the present invention to provide an improved process for making MMC components, which is simple and faster to carry out and yet reliable.

These objects, and others which will become apparent hereinafter, are attained in accordance with the present invention by mixing particulate ceramic powder with a liquid carrier, without addition of a binder, to prepare a slip having thixotropic properties; introducing the slip into a casting mold of substantially dense consistence; subjecting the casting mold to vibrations so as to separate the carrier from the ceramic particles and to allow the carrier to float upon the ceramic particles while at the same time compacting the slip to realize a ceramic preform of porous consistency having pores; terminating the exposure of the casting mold to vibrations; removing the liquid carrier; allowing the preform to solidify in the casting mold, without exposure to any further compaction measures, such as sintering, pressing or the like, and maintaining the casting mold in a state of rest; and pouring matrix metal into the casting mold to fill the pores of the preform.

The process of making a metal matrix composite, in accordance with the present invention, is divided in substantially two stages, with the first stage directed to the manufacture of the porous preform, and the second stage directed to the subsequent infiltration of the preform with matrix metal, i.e. the matrix metal infiltrates the pores of the preform, whereby an essential feature of the present invention resides in the linkage of both stages with one another and the modification of measures between both stages.

As the preform is made in a casting mold in which it remains for subsequent infiltration, a removal of the preform from the casting mold before infiltration is no longer required so that the drawbacks associated with prior art processes have been eliminated. The preform remains in the same casting mold throughout, and thus no measure must be undertaken to impart a particular strength, thereby further eliminating a step required to date. The elimination of two method steps results in a significant simplification and acceleration of the MMC production.

Extraction of the liquid carrier from the slip through vibrating the casting mold is significantly faster to implement than conventional methods for extraction of liquid through heating or evacuation of the casting mold environment or through using porous casting molds.

Suitably, the slip is caused to vibrate before and during introduction thereof into the casting mold. The use of tools, such as ladles or scoops, separate from the slip container, for introducing the slip into the casting mold can thereby be omitted. Pouring of the slip into the casting mold may be realized by tilting the slip container, or by opening a valve in a connection conduit between the slip container and the casting mold.

According to another feature of the present invention, the extraction of the liquid carrier may be realized through heating the carrier to a temperature above the evaporation point of the liquid carrier. As the following infiltration of the preform with metal necessarily requires heating up the preform, respective kilns are anyway provided and can be used to implement the evaporation of the liquid carrier. Separate devices for extraction of the carrier, such as suction units are unnecessary, thereby further contributing to the simplification of the MMC manufacturing process according to the present invention.

Water, tertiary butanol, butanol-2 and amyl alcohol may be used as preferred substances for the liquid carrier. In particular water is cost-efficient and provides thixotropic properties of the slip in a majority of ceramic materials that are possible for formation of the preform. Non-aqueous carriers are not as cost-efficient, but their extraction can be carried out significantly faster and more complete.

Suitably, a ceramic powder with multimodal particle distribution is used. These types of ceramic powder results in a preform body, when subject to vibrations, with a particularly high packing density and higher strength, compared to a ceramic powder with monomodal particle distribution. It is also possible to use a ceramic powder having particles made of ceramic carbides, nitrides, borides, and oxides, such as, e.g. SiC, TiC, $B_4C$, AlN, $Si_3N_4$, BN, and $Al_2O_3$. These materials exhibit different mechanical, electrical and thermal properties, but are all suitable for use in the process according to the invention. A suitable selection of the used ceramic powder that may also be a mixture of different ceramic materials, permits an adjustment with respect to the mechanical, electrical and thermal properties of the resulting preform and of the ultimately resulting MMC body. Preforms containing SiC partially or entirely, lead to the formation of MMC components that exhibit especially good heat conductivity as well as especially high mechanical strength.

Examples for matrix metal include Al, Ni, Co, Fe, Mo, Mn, and Cu. Also these materials have different mechanical, electrical and thermal properties, but are all suitable for use in the process according to the invention. Through appropriate selection of the infiltration metal, which may also be an alloy of various pure metals, the mechanical, electrical and thermal properties of the resultant MMC body can be adjusted.

According to another feature of the present invention, a porous ceramic body may be placed upon the bottom of the casting mold before introducing the slip into the casting mold whereby the porous ceramic body has a porosity which is greater than the porosity of the preform obtained from the slip. Suitably the porous ceramic body has the configuration of a board of slight thickness. Some applications require to provide the MMC component with a particular flexure or to precisely adjust the evenness of the MMC plate. This can be implemented through placement of a highly porous ceramic board into the casting mold. As a consequence, a preform is made having two zones of different porosity: the zone of the inserted board has a greater porosity than the zone of slip above. During infiltration of this preform with metal, more metal can penetrate into the bottom zone of greater porosity of the resulting MMC component compared to the top zone so that the MMC component is provided with two layers of different structure and different properties. The bottom layer with the significantly higher share on metal causes the entire MMC component to bend in its direction (same effect as in a bimetal). Through appropriate selection of the thickness of the inserted ceramic body, the degree of flexure can be adjusted.

In this context, it is advantageous to use a ceramic body made of the material of the ceramic particles contained in the slip, because in this case, the only difference between both zones of the resulting MMC component resides in the amount of infiltration metal so that the differences with respect to properties of both these zones can fairly easily be assessed. Suitably, the porous ceramic body may be made by introducing into the casting mold, before introduction of the slip, an emulsion comprised of fine ceramic powder with a mean particle size of less than 15 $\mu$m, or a powder mixture 70/30 with a particle size of 12 $\mu$m and 3 $\mu$m, and a liquid carrier, and then smoothing and drying the emulsion. Thus, the formation of porous ceramic bodies can be executed with the same tools (casting mold, vessels, etc.) as used for producing the second preform zone from the slip, so that the extra time required for making the porous ceramic body in this embodiment of the process according to the invention is essentially negligible. Hereby, it is advantageous to use a ceramic powder which is made from the material of the ceramic particles contained in the slip in order to realize the afore-mentioned formation of the ceramic body from the material of the other preform zone.

According to another feature of the present invention, ceramic particles may be sucked off, before the pouring step, from a surface area of the preform to produce structures, such as bores and grooves. In this manner, the preform can be manipulated without exposure to significant wear. Therefore, the technical expenditure is significantly reduced as a result of the reduced wear since the use of high-strength tools, as required to date in conventional processes after a sintering process, is no longer required. Suitably, before removing ceramic particles, the respective surface area is loosened by means of hobs or dies or the like. The material being removed can then be withdrawn at significantly less suction powder, so that the risk of inadvertently sucking away ceramic particles from neighboring areas is significantly reduced and structures with particularly precisely defined contours can be realized. Optionally, it is possible to insert locators or inserts in the structures formed through removal of ceramic particles from certain surface areas. These locators prevent a penetration of infiltration metal into the produced structures and after removal of these locators—which is easier to accomplish than a removal of infiltration metal—the structures in the final MMC component are created.

BRIEF DESCRIPTION OF THE DRAWING

The above and other objects, features and advantages of the present invention will be more readily apparent upon reading the following description of preferred exemplified embodiments of the invention with reference to the accompanying drawing, in which.

DETAILED DESCRIPTION OF PREFERRED EMBODIMENTS

Figure 1:
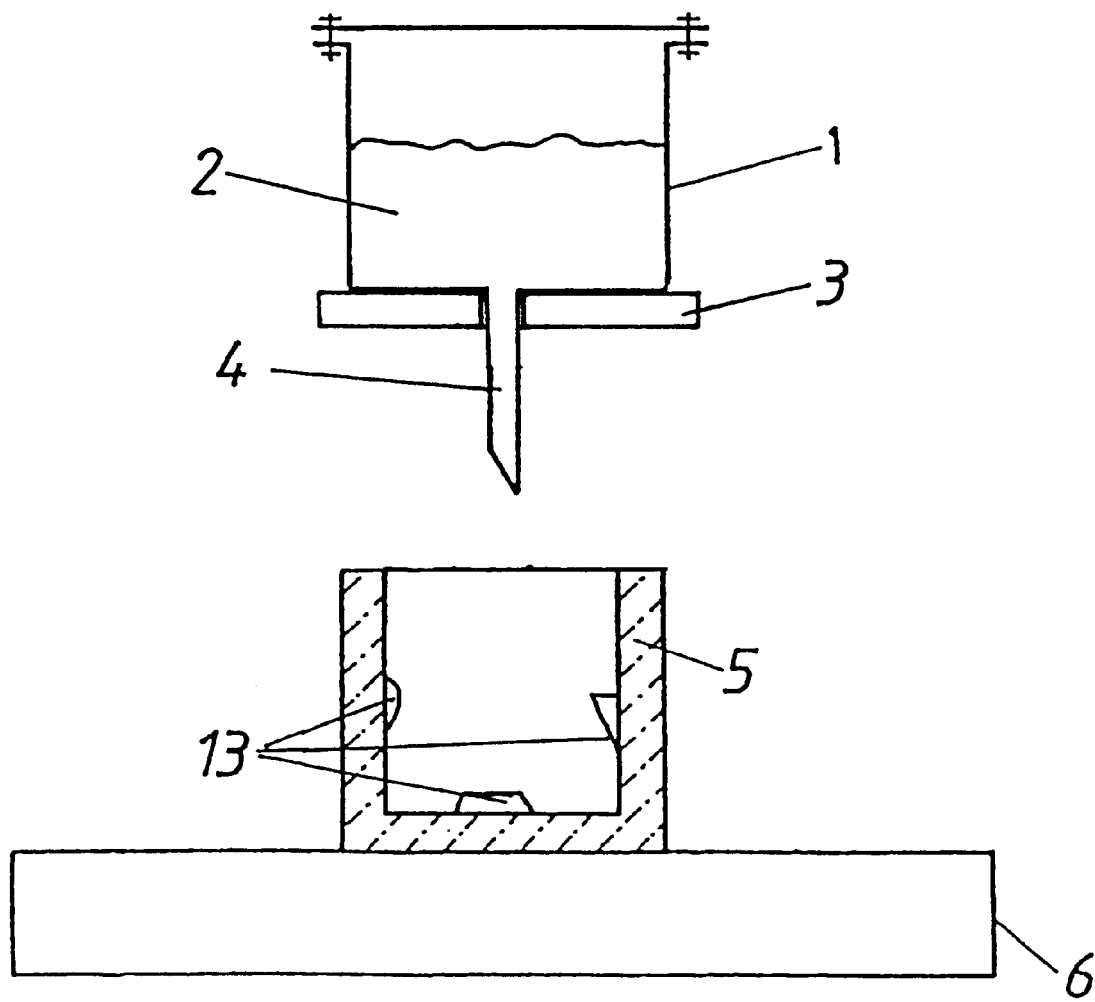
FIG. 1 is a schematic illustration of an exemplified arrangement for carrying out the manufacture of a porous preform, involved in a process for making a MMC component in accordance with the present invention.

Throughout all the Figures, same or corresponding elements are generally indicated by same reference numerals.

A metal matrix composite (MMC) includes, on the one hand, a ceramic preform having porous consistency, and, on the other hand, a matrix metal which is introduced into the porous of the preform. In addition, the outer surface of the preform may be surrounded by a layer of matrix metal, i.e. the metal is cast around the outer surface. A process for making such a metal matrix composite, in accordance with the present invention, is divided in substantially two stages.

The first stage includes the manufacture of the porous preform, and the second stage includes the subsequent infiltration of the preform with matrix metal, i.e. the matrix metal infiltrates the pores of the preform. The subject matter of the present invention is directed to the entire manufacture of the metal matrix composite and thus is involved with the entirety of both these stages.

As stated above, the preform may be made from a loose material of ceramic powder, with the pores being formed by the spacing between individual particles of this loose material. The preform is formed by one or more self-contained bodies of porous consistency.

The preform is manufactured by mixing ceramic powder with a liquid carrier, without addition of a binder, to prepare a slip having thixotropic properties. By omitting the use of a binder, the entire MMC manufacturing process is substantially improved because the time-consuming extraction of binder is avoided and the problems associated with extracting the binder are eliminated.

The realization of thixotropic properties depends from the material and quantity of the liquid carrier, on the one hand, and from the ceramic powder, on the other hand. Furthermore, particle sizes and particle distributions within the ceramic powder should be taken into account. Further, it must be ensured, that a liquid carrier is selected which does not attack or chemically alter the used ceramic powder. The liquid carrier should be fluid at room temperature. It should evaporate at temperatures below 200° C. and become solid only at temperatures below 20° C. A low vapor pressure should also be aimed at in order to provide a longer service life of the liquid carrier. A high vapor pressure may result in a relatively rapid evaporation so that the concentration changes during manufacture of the preform. Still, this does not mean to exclude the use of products which receive these parameters through change of the temperature or the pressure. Examples of such liquids include, for example, water, organic solvents, monohydric or dihydric alcohols, and organic acids. Tertiary butanol is an example for another product which can still be solid at room temperature (melting point 23–25° C.). Further examples for liquids usable as carrier include butanol-2 and amyl alcohol. The thixotropic properties are further impacted by the pH value of the liquid carrier so that also the addition of substances (acid or lye) that alter the pH value may be used to adjust the demanded thixotropic properties.

On the basis of this information, a person skilled in the art will be in a position to select for each ceramic material the correct liquid carrier in an appropriate quantity, without undue experimentation. Still, the following table illustrates suitable slip compositions having thixotropic properties:

|  |  | Ceramic Powder | | | Liquid Carrier | |
|---|---|---|---|---|---|---|
|  | Material | Fraction in Slip | Particle Size | Particle Distribution | Material | Fraction in Slip |
| 1st Example | SiC | 440 g | F100HD/F500HD/ F600HD/F1200 | 70/12.5/12.5/5 | Butanol-2 | 68 ml |
| 2nd Example | SiC | 220 g | F240/F500HD/ F600HD/F1200 |  | Butanol-2 | 52 ml |
| 3rd Example | SiC/AlN | 200 g | SiC: F500HD/F1200 AlN: F240 | SiC: 70/25 AlN: 100 SiC/AlN = 50:50 | Tertiary Butanol | 48 ml |

Each of these slips is incapable to flow in state of rest as a consequence of its thixotropic properties. When applying shearing forces on the slip, by subjecting the slip of vibrations, the slip is able to flow and thus can be poured into the casting mold.

Turning now to the drawing, and in particular to FIG. 1, there is shown a schematic illustration of an exemplified arrangement for carrying out the manufacture of a porous preform, involved in a process for making a MMC component in accordance with the present invention, and in particular illustrates a practical solution of pouring slip into a casting mold while being vibrated. The arrangement includes a vessel 1 which contains slip 2 and is placed upon a vibratory plate 3. The vessel 1 is formed with a bottom opening for connection to a downspout 4 so as to allow the slip 2 to flow into a casting mold 5 located beneath the vessel 1. In order to avoid an undesired incomplete filling of the casting mold 5 with slip 2 as a result of a stoppage of applied vibrations when the slip 2 exits the downspout 4, and in particular has reached the interior of the casting mold 5, the casting mold 5 is also placed on a vibratory plate 6 which subjects the casting mold 5 to vibrations to thereby realize a complete filling of the casting mold 5 with slip 2. The casting mold 5 is exposed to vibrations at least to a time after concluding the introduction of the slip 2 so that slip 2 remains fluid and is able to evenly spread out in the casting mold 5. Suitably, the casting mold 5 is exposed to vibrations already during the introduction of slip 2 either continuously or intermittently. Vibration of the casting mold 5 ensures that the slip 2 is able to flow evenly within the casting mold 5 to thereby ensure a complete filling of the casting mold 5.

As an alternative solution, that lacks means for vibrating the vessel 1 when introducing the slip 2 into the casting mold 5, it is also possible to use scoops or ladles, manually or machine-operated, e.g. by means of a robotic arm, for introducing the slip 2 in the form of single lumps into the casting mold 5. Also in this case, the casting mold 5 is vibrated at least after introduction of the slip 2, preferably, however, already during the slip introduction.

The casting mold 5 has a substantially dense consistency. This means also that the casting mold 5 does not apply any capillary suction effect that would extract liquid carrier from the slip 2, as suggested to date by conventional processes. An example of a suitable material for the casting mold 5 includes in particular graphite.

Once the intended amount of slip 2 is completely poured into the casting mold 5 and evenly spread in the casting mold 5 through exposure to vibrations, the slip 2 could be left, at this point, to solidify, which could be realized by simply stopping the vibrations and leaving the casting mold 5 in a state of rest, i.e. shutting down the vibratory plate 6. However, as the solidified slip 2 still contains liquid carrier, which must be removed before transforming the slip 2 into a preform body and ultimately into a MMC component, and as the slip 2 has to be compacted to a preform body, the present invention proposes in a single method step to extract the liquid carrier from the slip 2 as well as to compact the remaining ceramic powder. Thus, after concluding the introduction of slip 2 into the casting mold 5 and before the slip 2 solidifies, the casting mold 5 is continued to vibrate so that the liquid carrier contained in the slip 2 is separated from the ceramic particles and is able float upon the ceramic particles, as the liquid carrier rises as a result of the vibrations whereas the ceramic particles migrate downwards in opposite direction. This segmentation is significantly accelerated by the vibrations so that the formation of the preform body is implemented in a significantly faster fashion compared to conventional processes in which the slip 2 is poured into porous casting molds, which are then left in a state of rest, and the liquid carrier is removed through the capillary suction effect of the casting mold.

The vibrations further cause the ceramic particles to closely pull together so as to realize a very high packing density of the resultant preform body. The close contact further results in a certain bond between individual particles so as to provide the preform body with a certain strength. Although the strength is less than a strength realized through sintering of freezing of the slip, this is of no consequence as the preform body does not require any greater strength for manipulation of the preform body as a result of further measures in accordance with the present invention.

The time period during which the casting mold 5 is vibrated to realize an extraction of the liquid carrier depends mainly on the volume of the preform. A rule of thumb is one minute of vibration per one millimeter of preform thickness. A further parameter affecting the duration of vibration is the particle composition of the preform. Depending on this parameter and on further parameters such as, for example, density and strength of the preform, also longer vibration times of 2–4 minutes and longer may be required. The vibration step leads to a separation of the liquid carrier and to a compaction of the ceramic particles as well as to a removal of air bubbles trapped in the slip 2.

The described high packing density as well as the compaction of the slip 2 to a preform body is realized to a significantly extent in particular when the ceramic powder contained in the slip 2 has a multimodal particle distribution. An example includes a quadmodal particle distribution in which 70% by vol. of the powder is formed by particles of a mean particle size of 70 $\mu$m, 12.5% by vol. is formed by a mean particle size of 13 $\mu$m, 12.5% by vol. is formed by a mean particle size of 10 $\mu$m, and 12.5% by vol. is formed by a mean particle size of 3 $\mu$m. At such a multimodal particle distribution, the vibrations of the slip 2 cause a depositing of fines in the spacing between larger particles so that a great number of existing voids are filled to a substantially degree with ceramic material. Furthermore, the vibrations ensure that differently sized particles are very evenly distributed across the entire volume of the casting mold 5. In particular, a separation of ceramic powder is prevented, as experienced in conventional segmentation processes in which heavier large particles drop downwards whereas the lighter small particles float upon the large particles, thereby causing an uneven material distribution associated with an inhomogeneous porosity of the preform (larger voids are formed between the heavier large particles than between the smaller, lighter particles), ultimately leading to an inhomogeneous MMC component.

Of course, the ceramic powder may also be monomodal and have a particle size of, for example 3 $\mu$m. Regardless whether a multimodal or monomodal particle distribution is involved, the ceramic powder should not be limited to fine particles with particle sizes in $\mu$m range, but significantly greater particles, i.e. up to particle sizes of 1 mm, may be used. Moreover, the ceramic powder may be formed substantially of a single material or of a mixture of several materials. Concrete examples for ceramic materials include carbides, nitrides, borides, and oxides, such as SiC, TiC, $B_4C$, AlN, $Si_3N_4$, BN, and $Al_2O_3$. A particularly useful ceramic powder is a SiC powder of random particle size.

Removal of the liquid carrier, collecting upon the preform body as a result of the applied vibrations, before further processing of the preform may be implemented in any suitable fashion known to the artisan. For example, the liquid carrier may be sucked away by a pipe under vacuum, or by an absorbing structure similar to a sponge or a sheet of blotting paper which is brought into contact with the liquid carrier. Preferred, however, is the evaporation of the liquid carrier, i.e. the liquid carrier is heated by raising the temperature of the ambient atmosphere above the evaporation point of the liquid carrier. This can easily be realized by heating the entire casting mold 5. The heating step effects a slight compaction of the preform body, thereby preventing further compaction of the preform body during subsequent filling of the pores with metal, which could possibly lead to inhomogeneities in the resultant MMC component.

As described above, the liquid carrier has a low evaporation point, so that the extraction of the liquid carrier can be effected at relatively low temperature. Thus, the energy consumption, required for implementing the heating action, is slight, and the stress upon the casting mold 5 and the slip 2, which are also heated during extraction of the liquid carrier through heat application, is only minimal.

Figure 4:
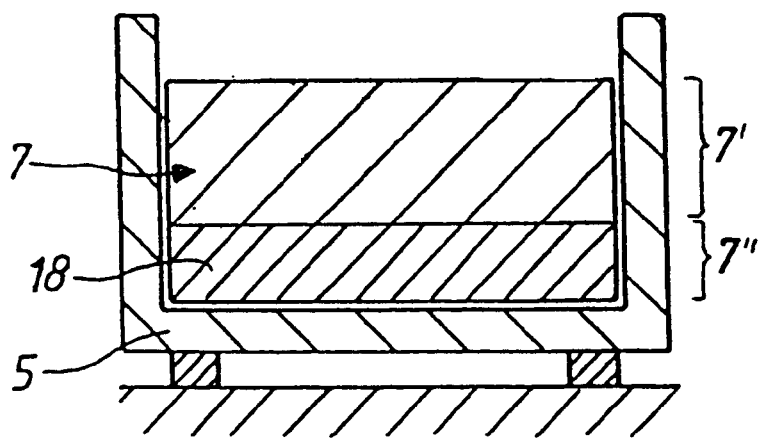
FIG. 4 is a schematic illustration of an exemplified arrangement for manufacturing a preform comprised of two zones.

Referring now to FIG. 4, there is shown a schematic illustration of an exemplified arrangement for manufacturing a preform, generally designated by reference numeral 7 and comprised of two zones 7' and 7" having different properties, e.g. made of different materials, and/or having different porosities, etc. To implement such a two-layer preform 7, a porous ceramic body 18 is placed on the bottom of the casting mold 5, before the slip 2 is introduced into the casting mold 5, whereby the ceramic body 18 has a porosity which is greater than the porosity of the preform zone 7' resulting from the slip 2. Preferably, the ceramic body 18 is formed as a board of slight thickness and may be fabricated outside the casting mold 5, i.e. having a firm consistency when placed in the casting mold 5. Preferred, however, is the fabrication of the porous ceramic body 18 by forming an emulsion comprised of ceramic powder with a mean particle size of less than 15 $\mu$m and a liquid carrier, and introducing the emulsion into the casting mold 5, before the slip 2 is poured into the casting mold 5. In the casting mold 5, the emulsion is smoothened and then dried, thereby forming the porous ceramic body 18 within the casting mold 5 prior to the introduction of the slip 2.

When using ceramic powder, in particular a SiC powder with a particle size of 3 $\mu$m, the ceramic body 18 or the obtained layer, has a porosity of about 25% by vol. The porosity may be additionally controlled through variation of the composition of the powder. For example, a ceramic powder mixture, especially a SiC powder mixture, having a 70% fraction of particles with a mean particle size of 12 $\mu$m and a 30% fraction of particles with a mean particle size of 3 $\mu$m, results in a porosity of 38% by vol.

Basically, the ceramic body 18 may be made of any suitable material, including of a material that is different than the material of the preform zone 7' resulting from the slip 2. Preferred, however, is the manufacture of the ceramic body 18 from the material of the ceramic particles contained in the slip 2. Thus, when making the ceramic body 18, the emulsion, being introduced into the casting mold 5, is based on a ceramic powder which is made of the material of the ceramic particles contained in the slip 2.

An essential feature of the present invention is the provision of process steps by which the phase between the first stage involved with the preform manufacture, and the second stage involved with the infiltration of this preform with metal is modified. As a stated above, in conventional processes the finished preform is removed from one casting mold and transferred to a further second casting mold for executing the infiltration step. To prevent a destruction of the preform and to make its handling easier, measures are taken to intend to greatly solidify or firm up the preform, typically by sintering, pressing or freezing of the liquid carrier that has not yet been extracted. Unlike conventional processes, the process according to the present invention is not concerned with measures to firm up the preform. Rather, after manufacturing the preform 7 in the casting mold 5, the preform 7 is retained in the casting mold 5 for subsequent infiltration with metal. It is only required to place the casting mold 5 with the contained preform body 7 in an apparatus for carrying out the infiltration, e.g. in a pressure vessel, kiln or the like; a removal of the preform 7 from the casting mold 5 is not required, and the infiltration metal can be poured into the casting mold 5. The dual use of the casting mold 5 avoids therefore all the problems associated with the detachment of a preform body from the casting mold, as experienced in conventional processes. The provision of a second casting mold is not required so that the time necessary for transferring a preform between casting molds can be saved.

Removal of the liquid carrier through heat application may occur during heating of the preform 7 prior to the metal infiltration. A separate heating of the casting mold 5 in a hot-air cabinet is not necessary as the casting mold 5 is heated immediately after discontinuing the application of vibrations during heating of the preform to a temperature required for metal infiltration, whereby the liquid carrier floating on the ceramic particles evaporates. In this manner, the process according to the invention can be carried with one less heating step, saving the need for required appliances (hot-air cabinet), so that the process can be expedited by the time period normally allocated for a drying step.

After removing the liquid carrier, the surface plane of the ceramic powder contained in the casting mold 5 is not aligned with the upper rim of the casting mold 5, but the powder made have more less uneven areas which extend beyond the rim of the casting mold 5. In order to insure that the casting mold 5 and a lid 8 (FIGS. 2a, 2b) can be snugly closed, excess powder projecting beyond the upper rim of the casting mold 5 must be stripped off or removed by hand or machine.

Figure 2A:
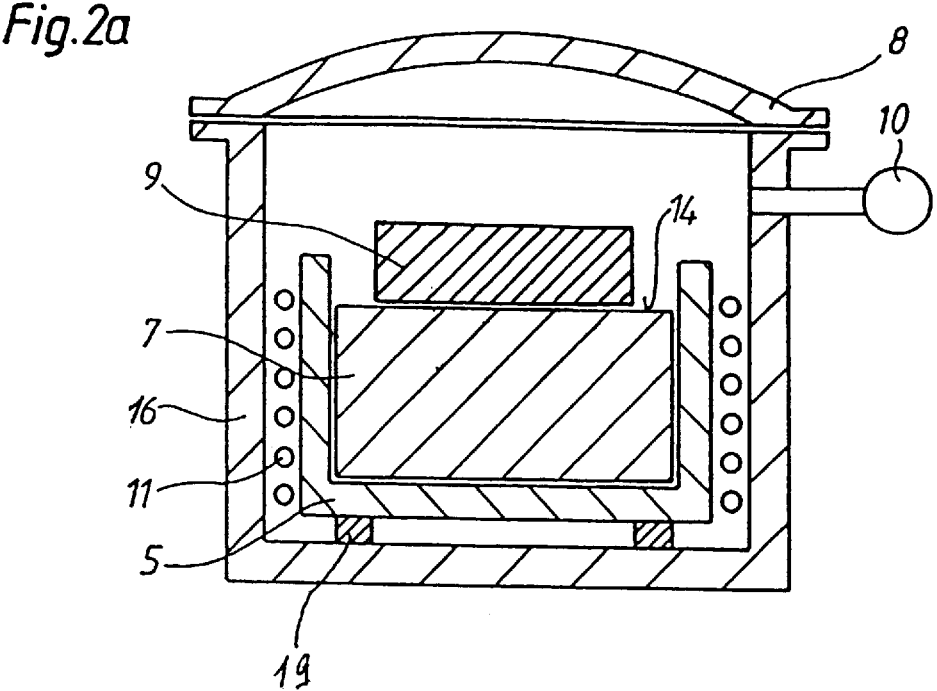
FIG. 2a is a schematic illustration of an exemplified arrangement for carrying out the infiltration of the porous preform with metal, involved in the process for making a MMC component in accordance with the present invention.
Figure 2B:
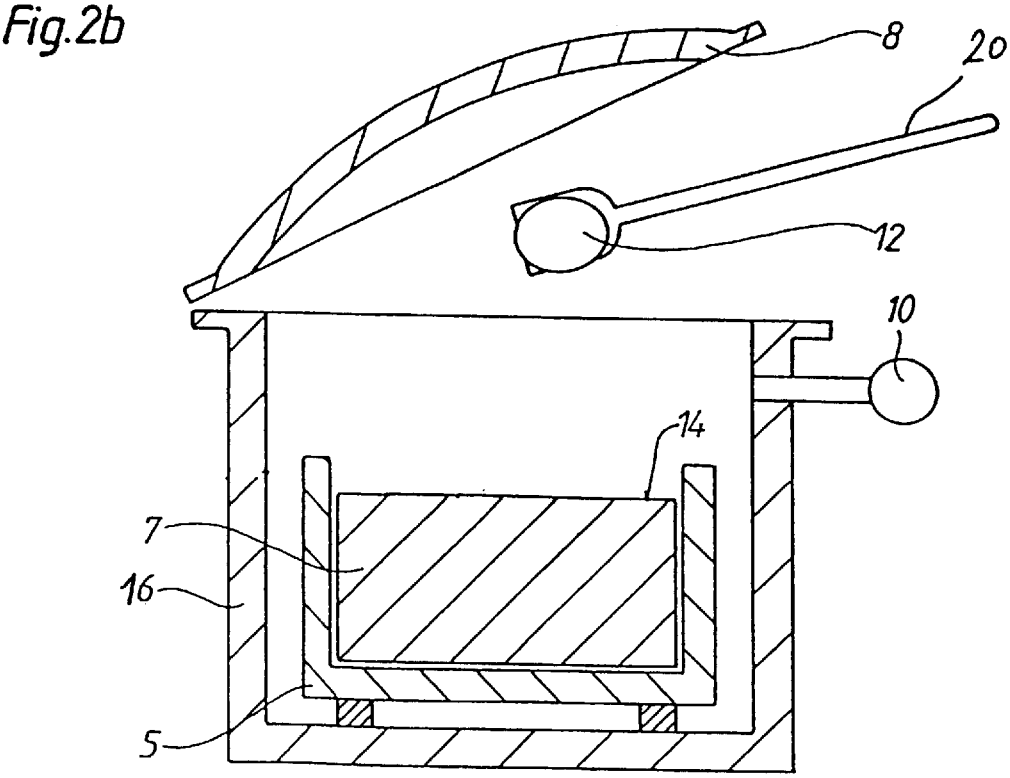
FIG. 2b is a schematic illustration of a variation of the step for the infiltration of the porous preform with metal.

As stated above, the infiltration step may be implemented in any suitable manner known to the artisan. Examples of suitable arrangements for carrying out the infiltration step are shown in FIGS. 2a and 2b which involve a gas pressure infiltration method. The arrangement according to FIG. 2a includes a pressure vessel 16 in which the infiltration step is executed. The casting mold 5 is placed via feet 19 inside the pressure vessel 16 upon its bottom and accommodate the preform 7. The pressure vessel 16 is closeable by the lid 8 so that pressure from a pressure source 10 can be applied. Placed upon the preform 7 is a feeder or block 9 made of infiltration metal and intended to melt down onto the preform 7. A heater 11 is incorporated in the pressure vessel 16 to heat the preform 7 and to melt the metal feeder 9. After complete melting of the feeder 9, the pressure vessel 16 is set under pressure by the pressure source 10 to force the liquid metal into the pores of the preform 7. Thereafter, the heater 11 is shut down, and the metal is left to solidify while maintaining the gas pressure within the pressure vessel 16.

As the pores of the preform 7 contain air which is compressed during forced migration of the metal into the preform 7 and retained within the preform 7, it may be suitable to remove the air before the infiltration step, for example, by evacuating the pressure vessel 16 before melting of the feeder 9, to prevent trapping of air inside the pores.

An alternative arrangement is shown in FIG. 2b. Parts corresponding with those in FIG. 2a are denoted by identical reference numerals and not explained again. In this embodiment, the provision of a heater is omitted, and the casting mold 5 with accommodated preform 7 as well as the metal 12 are heated at a location outside the pressure vessel 16. The metal 12 is thus poured, e.g. by a ladle 20 in melted state upon the preform 7. Then, the lid 8 is closed and the interior of the pressure vessel 16 is pressurized by the pressure source 10 to thereby force the liquid metal into the pores of the preform 7. The metal is then left to solidify.

In both variations, the casting mold 5 is used to make the preform 7 and to retain the preform 7 during infiltration. Of course, instead of the gas pressure infiltration method, other infiltration methods may be used, for example, a method with mechanical pressure application (so-called squeeze-casting method) or spontaneous infiltration method. These methods are generally known by the artisan and thus will not be described in more detail.

Oftentimes, MMC components require the provision of three-dimensional structures such as throughholes, threads, grooves, slots, large-area indentations or the like. A refinishing of an already solid MMC material is complicated and cost-intensive as a consequence of the high abrasive character of the MMC material. It is much simpler to accordingly manipulate the finished preform before infiltration with metal, or to fabricate the preform already with the desired structures, i.e. during slip casting of the preform.

Manipulation of a final preform can be implemented basically only by material-removing processes which include green treatment when shaping is concerned, or intermediate firing or biscuit firing in which the component has not yet realized the final strength, or white treatment, or hard treatment after sintering in the state of final strength. In the context of green treatment, it should be noted that the green product has only slight strength which on occasion is sufficient for handling. The white treatment results in a greater strength of the component. Hard treatment after sintering the components, i.e. densely sintered components, can be carried out only in a very difficult manner as a result of the substantial strength of the component. Possible shaping processes include only grinding, honing or lapping with diamond tools. Therefore, significant changes in the configuration through hard treatment are very cost-intensive, and complex components can essentially no longer be fabricated. A further drawback of above methods is the variation in size after shaping or after green treatment or white treatment, in view of the subsequent sintering step or thermal compaction. When the molded part is intended for further use, i.e. as preform for the MMC production, the size further changes during infiltration with metal and because of the resultant metal layer that forms around the molded part. In addition, the preform retention has an impact during the infiltration on the final size.

The complexity of the changes in size requires experience and, depending on the complexity of the molded part, cumbersome tests to determine the changes in size and to ultimately conclude the required dimensions of the mold configuration. Implementation of complicated shapes requires therefore the use of complex pressing tools. As a consequence of the changes encountered during firing and the changes in size during infiltration, the provision of correct end measures is time-consuming as well as complex. It is also disadvantageous that internal tensions are experienced in the material during sintering in view of the asymmetric distribution of the material in the molded part. Complex shapes cause also different material accumulations in the molded part, and material accumulations result in different shrinkage processes. This may result in warping and faults which adversely affect, for example, the evenness and the parallel configuration of the molded part.

In order to fabricate the preform with the desired structures, it is possible to place, e.g. glue, locators or inserts 13 (FIG. 1) at the inside wall of the casting mold 5 at those locations where the structures should be provided before introduction of the slip 2 into the casting mold 5, whereby the locators 13 have a configuration which substantially corresponds to the structure being generated. The locators 13 may be made, for example, of aluminum, graphite, or graphite/aluminum. During pouring of the slip 2 into the casting mold 5, the slip 2 is cast around the locators 13, thereby keeping the area of these locators 13 free from slip 2 and thus from the preform material. During subsequent infiltration process, infiltration metal is cast around the locators 13 so that these areas, too, are kept free from the infiltration metal. After concluding the MMC production and removal of the MMC component from the casting mold 5, the locators 13 are removed, e.g. through drilling, knocking out or pressing out, and the finished MMC component has the desired texture at the position of these locators 13.

It is also possible to leave the locator 13 in the MMC component and to work on it only. This is of interest in those situations that desire fabrication of throughholes and threads which can be drilled or cut into the locators 13, made suitably of metal, preferably aluminum. Of course, it is also possible to use steel bolts or graphite bolts as locators 13 for fabrication of throughholes, whereby the bolts are pressed out from the MMC component after the MMC component is removed from the casting mold 5.

Figure 3:
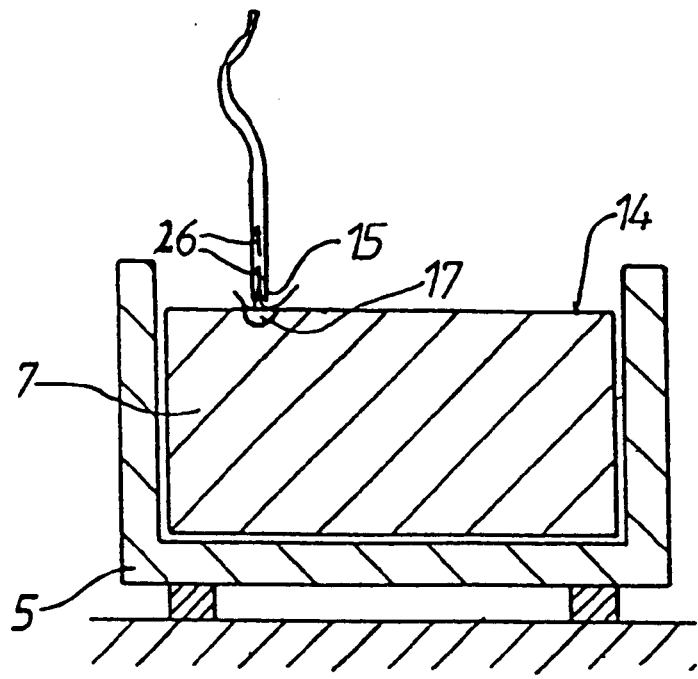
FIG. 3 is a schematic illustration of an exemplified arrangement for providing a structure in the preform after its formation.

This option of forming structures is possible, however, only upon those surfaces of the MMC component which bear on the wall surface of the casting mold 5. As the casting mold 5 is open on one side (cf. FIGS. 1, 2a, 2b), the preform 7 has a surface 14 which cannot be provided with structures through placement of locators 13. Formation of structures in the surface 14 can be realized in accordance with the present invention, by drawing ceramic particles from areas of the surface 14, prior to the introduction of metal into the pores of the preform 7, to create structures such as bores, grooves etc. Reference is made in particular to FIG. 3 which shows a schematic illustration of an exemplified arrangement for providing a structure in the preform 7. The arrangement includes a suction nozzle 15 which is under negative pressure to generate an air flow indicated by arrows 26 for knocking out and entraining ceramic particles from the surface 14. The suction nozzle 15 may be operated by a CNC control for precise movement and production of accurate surface structures. By appropriately dimensioning the nozzle 15 with respect to diameter, shape, degree of the negative pressure, structures 17 of a wide variety can be fabricated, e.g. throughholes, blind holes with different cross section (rectangular, square, round, oval etc.) Further parameters impacting on the configuration of the structures 17 include suction power (amount or air per time unit) as well as the lowering speed of the nozzle 15 into the powder bed. When too rapidly lowering the nozzle 15 at constant suction power, the suction power is insufficient and powder residues remain in the generated structure. In the event, the nozzle is lowered too slowly into the powder bed, powder is knocked out from the surrounding area of the hole, resulting in a hole that is too large and uneven.

To ensure structures 17 with particularly accurately defined contours, it may be suitable to loosen the material in those areas of the preform 7 that should be removed, before the actual suction process takes place. This can be done through mechanical treatment of these areas, e.g. by using hobs or dies or the like. After such a pre-treatment, the material to be removed can be withdrawn at substantially less suction power, thereby better protecting the regions that should remain unaffected from the suction effect. An inadvertent aspiration of particles from these regions is thus substantially prevented.

These treatment processes work because of the manner in which the preform is fabricated in accordance with the present invention. These preforms have only a low strength that allows to remove ceramic particles by means of the nozzle 15, while yet ensuring that the side walls of the structures being generated remain stable and do not collapse. If the strength of the preform were too low, as would be the case for loosely poured ceramic material, removal of precisely defined areas would not be possible as too many ceramic particles will be carried off by the air flow and/or the wall of the resultant structures would collapse. On the other hand, a strength that is too high will result in no sufficient removal of material.

Before infiltration with metal, the structures 17 may be filled with locators or inserts to prevent a casting with infiltration metal. After conclusion of the infiltration step, the locators can be removed by mechanical treatment, e.g. drilling, knocking out etc.. It is also possible to carry out the infiltration without filling the structures, which thus become filled with infiltration metal. However, like the locators, the infiltration metal can be removed subsequently through mechanical treatment to provide the resultant MMC component with the desired structure.

The locator may be made of graphite which can easily be worked on. The fabrication of a throughhole can be implemented in substantially two ways: The ceramic particles are sucked away in the area of the throughhole, and the resultant hole in the preform 7 is or is not filled with a locator of graphite before infiltration. After infiltration, either infiltration metal or the locator is removed by drilling. As an alternative, a steel bolt is used as locator which can be squeezed out after infiltration of the preform.

While the invention has been illustrated and described as embodied in a process of making a metal matrix composite (MMC) composite, it is not intended to be limited to the details shown since various modifications and structural changes may be made without departing in any way from the spirit of the present invention.

What is claimed as new and desired to be protected by Letters Patent is set forth in the appended claims.

What is claimed is:

1. A process for making a metal-matrix composite (MMC) component, comprising the steps of:
   mixing particulate ceramic powder with a liquid carrier, without addition of a binder, to prepare a slip having thixotropic properties;
   introducing the slip into a casting mold of substantially dense consistency;
   subjecting the casting mold to vibrations so as to separate the carrier from the ceramic particles and to allow the carrier to float upon the ceramic particles while at the same time compacting the slip to realize a ceramic preform of porous consistency having pores;
   terminating the exposure of the casting mold to vibrations;
   removing the liquid carrier;
   allowing the preform to solidify in the casting mold, without exposure to any further compaction measures, and maintaining the casting mold in a position of rest;
   pouring matrix metal into the casting mold to fill the pores of the preform; and
   placing into the casting mold a porous ceramic body of a porosity which is greater than a porosity of the preform, before introduction of the slip.

2. The process of claim 1, and further comprising the step of subjecting the slip to vibration before the introduction step and during introduction into the casting mold.

3. The process of claim 1 wherein the removing step includes heating the carrier to a temperature above an evaporation point of the carrier.

4. The process of claim 1 wherein the carrier is selected from the group consisting of water, tertiary butanol, butanol-2 and amyl alcohol.

5. The process of claim 1 wherein the ceramic powder has a multimodal particle distribution.

6. The process of claim 1 wherein the ceramic powder has particles selected from the group consisting of ceramic carbides, nitrides, borides, and oxides.

7. The process of claim 6 wherein the ceramic powder has particles selected from the group consisting of SiC, TiC, $B_4C$, AlN, $Si_3N_4$, BN, and $Al_2O_3$.

8. The process of claim 1 wherein the matrix metal is selected from the group consisting of Al, Ni, Co, Fe, Mo, Mn, and Cu.

9. The process of claim 1 wherein the ceramic body has the configuration of a board of slight thickness.

10. The process of claim 1 wherein the ceramic body is made of a material formed from the material of the ceramic particles contained in the slip.

11. The process of claim 1 wherein the porous ceramic body is made by introducing into the casting mold, before introduction of the slip, an emulsion made from a liquid carrier and a material selected from the group consisting of fine ceramic powder with a mean particle size of less than 15 $\mu$m, and a powder mixture 70/30 with a particle size of 12 $\mu$m and 3 $\mu$m, smoothing and drying the emulsion.

12. The process of claim 11 wherein the ceramic powder is made of a material formed from the material of the ceramic particles contained in the slip.

13. A process for making a metal-matrix composite (MMC) component, comprising the steps of:
   mixing particulate ceramic powder with a liquid carrier, without addition of a binder, to prepare a slip having thixotropic properties;
   introducing the slip into a casting mold of substantially dense consistency;
   subjecting the casting mold to vibrations so as to separate the carrier from the ceramic particles and to allow the carrier to float upon the ceramic particles while at the same time compacting the slip to realize a ceramic preform of porous consistency having pores;
   terminating the exposure of the casting mold to vibrations;
   removing the liquid carrier;
   allowing the preform to solidify in the casting mold, without exposure to any further compaction measures, and maintaining the casting mold in a position of rest;
   pouring matrix metal into the casting mold to fill the pores of the preform; and
   drawing ceramic particles from a surface area of the preform to produce at least one structure, before the pouring step.

14. The process of claim 13 wherein the at least one structure is a bore or a groove.

15. The process of claim 13, and further comprising the step of loosening the surface area of the preform before the drawing step.

16. The process of claim 15 wherein the loosening step is implemented through surface treatment by means of a hob or die.

17. The process of claim 13, and further comprising the step of placing a locator in the structure formed by the drawing step.

18. The process of claim 13, and further comprising the step of subjecting the slip to vibration before the introducing step and during introduction into the casting mold.

19. The process of claim 13 wherein the removing step includes heating the carrier to a temperature above an evaporation point of the carrier.

20. The process of claim 13 wherein the carrier is selected from the group consisting of water, tertiary butanol, butanol-2 and amyl alcohol.

21. The process of claim 13 wherein the ceramic powder has a multimodal particle distribution.

22. The process of claim 13 wherein the ceramic powder has particles selected from the group consisting of ceramic carbides, nitrides, borides, and oxides.

23. The process of claim 22 wherein the ceramic powder has particles selected from the group consisting of SiC, TiC, $B_4C$, AlN, $Si_3N_4$, BN, and $Al_2O_3$.

24. The process of claim 13 wherein the matrix metal is selected from the group consisting of Al, Ni, Co, Fe, Mo, Mn, and Cu.

* * * * *